United States Patent
Banks

Patent Number: 5,282,076
Date of Patent: Jan. 25, 1994

[54] STRAIN AND TEMPERATURE COMPENSATION IN ELECTRO-OPTIC MODULATORS

[76] Inventor: Frank J. Banks, 1813 Parliament, Leucadia, Calif. 92024

[21] Appl. No.: 408

[22] Filed: Jan. 4, 1993

[51] Int. Cl.$^5$ ............................ G02F 1/03; G02F 1/035
[52] U.S. Cl. ........................... 359/249; 359/250; 359/259; 385/2
[58] Field of Search ............... 359/249, 250, 259, 254, 359/255, 499; 385/1, 2, 3, 8

[56] References Cited

U.S. PATENT DOCUMENTS

| | | | |
|---|---|---|---|
| 3,429,636 | 2/1969 | Wentz | 359/259 |
| 3,497,831 | 2/1970 | Hickey et al. | 359/250 |
| 3,644,017 | 2/1972 | Ploss | 359/250 |
| 3,741,626 | 6/1973 | Wentz | 359/250 |
| 4,027,949 | 6/1977 | Lobb | 359/250 |
| 4,094,581 | 6/1978 | Baldwin et al. | 359/249 |
| 4,327,971 | 5/1982 | Kondo et al. | 359/250 |
| 4,379,620 | 4/1983 | Erickson | 359/259 |
| 4,514,046 | 4/1985 | Carlsen et al. | 359/259 |
| 4,722,597 | 2/1988 | Takubo et al. | 359/249 |
| 5,157,539 | 10/1992 | Beasley | 359/259 |

*Primary Examiner*—Martin Lerner
*Attorney, Agent, or Firm*—Frank D. Gilliam

[57] ABSTRACT

A device for compensating for changes in temperature and strain in electro-optic modulators without altering the voltage field effects. Devices for modulating light intensity in response to a varying electrical signal are particularly useful with optical fiber information sensing systems. Such modulators basically receive a light signal, collimate and polarize the light, then pass it through a wave plate to cause circular polarization. The light signal then is passed through a modulator material which rotates the beam polarization in response to varying voltage signals imposed on the modulator. Unfortunately, changes in temperature and strain also change the state of polarization. I have now found that by transmitting the light signal through two equal crystals in series that are rotated 180° from each other, a uniform strain or temperature change will result in canceled polarization effects. Thus, effects of changes in temperature and/or strain are canceled without affecting the voltage field effects.

10 Claims, 1 Drawing Sheet

STRAIN AND TEMPERATURE COMPENSATION IN ELECTRO-OPTIC MODULATORS

BACKGROUND OF THE INVENTION

This invention relates in general to electro-optic modulators and, more specifically for arrangements for compensating for strain and temperature changes in such a modulator.

Over the years, systems have come into use which use electrical signals passing through wires from input means to sense information and return the information to a distant location for use. These systems are much lighter in weight, occupy little space and provide redundant wiring paths to protect against loss of contact if one wire is damaged. Unfortunately, these systems are subject to short circuits or other damage to the wires, electromagnetic interference (EMI) from nearby wiring or electrical devices and are potentially subject to destruction by electromagnetic pulses (EMP) from nuclear blasts or other sources. There is a particular need to overcome these problems in military aircraft, missiles and ships and in numerically controlled machine tools and robotics where EMI and EMP pose serious problems.

Recently, considerable interest has developed in using optical fiber systems for passing information rapidly and accurately from a remote sensor over long distances. Optical fiber systems have many advantages over the wired electrical circuits EMI and EMP, short circuit potential and are lighter in weight which is very important for aerospace applications. Typical fiber optic control systems are disclosed by Sichling in U.S. Pat. No. 4,246,478 and Blackington in U.S. Pat. No. 4,313,226.

Many specialized devices have been used in optical fiber systems for transducing electrical or mechanical position or quantity signals into a proportional light signal suitable for transmission through a fiber. Typical of these are the systems disclosed by Walker in U.S. Pat. No. 4,454,418 and Lockett et al. in U.S. Pat. No. 4,479,264. In many cases it is necessary to transmit light from a friendly environment (e.g., low temperature with no electro magnetic interference such as an aircraft electronics bay) to a hostile environment (e.g., flight controls, engine controls) encode data by modulating the light beam with an electrical signal, and returning the modulated light back to the friendly environment for translation and use. A number of such electro-optic modulators are in use, such as those described by R.A. Becker in his paper, "Broad-Band Guided-Wave Electro-optic Modulators", IEEE Journal of Quantum Electronics, Vol. QE-20, No. 7, July 1984.

A particularly effective electro-optic modulator is described in my U.S. Pat. No. 4,950,000. That electro-optic modulator system basically comprises a device and method for modulating light intensity in accordance with a varying electrical signal and which can receive constant amplitude light through an optical fiber, modulate the light and return the modulated light to the source through the same fiber. The device includes several components positioned within an elongated cavity in a supporting body. a lens at one end of the cavity is arranged to receive light from and end of an optical fiber held against the lens. The lens collimates the incoming light into a narrow collimated light beam. The beam is then polarized and partially retarded to circular polarization and passed through a modulating material to a mirror, which reflects the modulated light back through the cavity and back into the optical fiber.

The modulator materials is capable of rotating beam polarization in response to voltages between two electrodes which are on opposite sides of a thin rib of the modulator material running the entire length of the modulator thus reducing the voltage in proportion to its length and width. Since light passes through the modulator twice, the optical effect of the modulator will be double that in prior art single-pass modulators, effectively further doubling system efficiency. The required voltage is halved and the second or output set of polarizer and lens is eliminated. The returning beam is attenuated by the polarizer as a function of the beam rotation in the modulator, so that the light level returning into and through the fiber is a function of the voltage imposed on the electrodes.

The device described in U.S. Pat. No. 4,950,884 provides outstanding performance. However, changes in strain and temperature adversely affect performance of that electro-optic system, as with other somewhat similar systems.

Thus, there is a continuing need for improved devices and modulator arrangements that eliminate the undesirable effects of temperature and strain changes while leaving the voltage fields unaffected.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figures 1, 2:
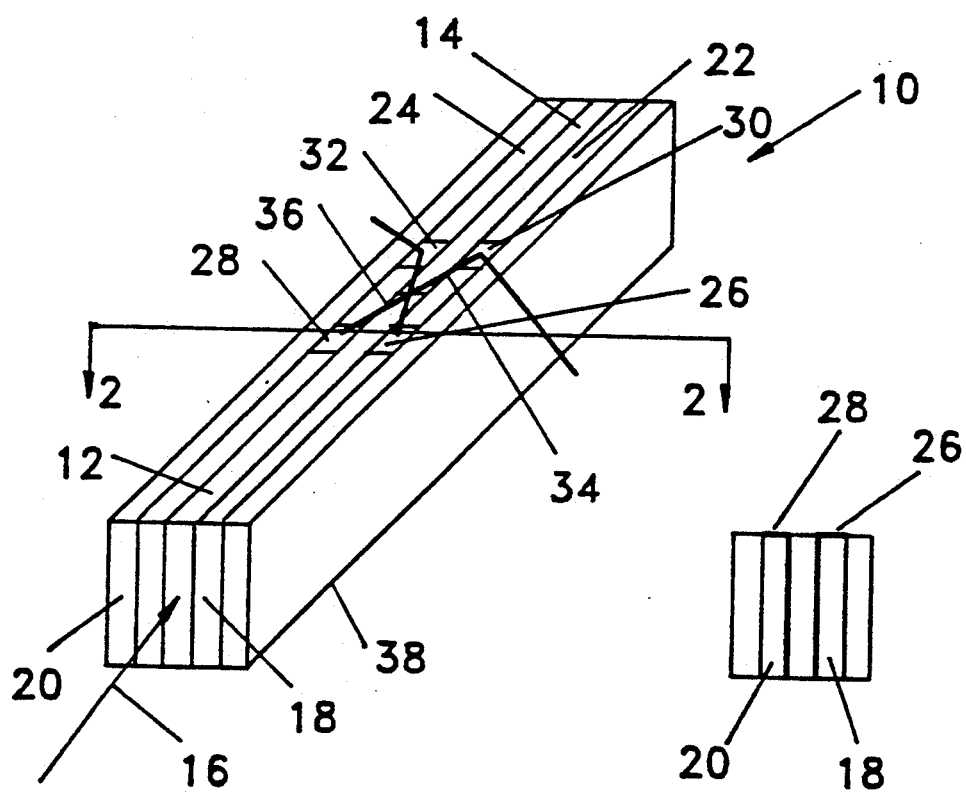
FIG. 1 is a perspective view of a modulator arrangement that overcomes strain and temperature effects.
FIG. 2 is a section view of the modulator, taken on line 2—2 in FIG. 1.

Referring to FIGS. 1 and 2, there is seen a modulator 10 of the sort that could be used in place of modulator 24 described in my above-mentioned U.S. Pat. No. 4,950,884 and other electro-optic systems using similar modulators. A particularly preferred application for the strain and temperature compensated modulator of this invention is in the system described in that U.S. Pat. No. 4,950,884, the disclosure of which is incorporated herein by reference. A pair of substantially identical active crystal bars 12 are arranged in an abutting, co-axial, relationship. The polarity of active bars 12 and 14 are mutually rotated 180° about their longitudinal axis, along which a light beam 16 is directed.

Short spacer bars 18, 20, 22 and 24 are arranged along the sides of active bars 12 and 14, toward their outer ends, leaving a gap between bars 18 and 22 and between bars 20 and 24. Thin film electrically conductive electrodes 26, 28, 30 and 32 are formed on a portion of the inner surfaces of spacer bars 18, 20, 22 and 24, respectively. Electrodes 26 and 28 extend down the opposite sides of active bar 16 as seen in FIG. 2, with electrodes 30 and 32 extending down the sides of active bar 14 in the same manner. Since the electrodes are quite thin, they embed easily in the material bonding the bars together.

The two active bars 12 and 14 are wired with opposite field polarity through conductor 34 connected to electrodes 28 and 30 and conductor 36 connected to electrodes 26 and 32. Thus, a uniform change in voltage field will result in summed polarization effects from the two active bars 12 and 14. Because of the opposite polarity, uniform strain and temperature effects will cancel out.

Outer bars 38 and 40 distribute temperature and strain uniformly to the active bars 12 and 14. All of the active bars 12 and 14, spacer bars 18, 20, 22 and 24 and outer bars 38 and 40 are made from identical material for uniform thermal and strain effects. Typical modulating materials which could be used for these bars and the use thereof are described by Homer Fay in his paper "Electro-Optic Modulation of Light propagating near the Optic Axis in LiNbO3", Journal of the Optical Society of America, Vol.59, No. 11, 1399-1404, November 1969.

Active bars 12 and 14 (and all of the other bars) may be formed from any electro-optic material that will rotate polarization of light as a function of the voltage impressed across electrodes 26 and 28 and across 30 and 32. Non-hygroscopic materials are preferred because of temperature and humidity limitations of otherwise suitable hygroscopic materials. Typical modulating materials include lithium niobate crystals (available from Union Carbide and Crystal Technology), potassium tantalate-niobate (available from Union Carbide), barium sodium-niobate (available from Union Carbide), and PbLaZrTi (PLZT) (available from Motorola.) Of these, best results have been obtained with LiNbO3 which effectively modulate multi-mode light and which is, therefore, preferred. Typically, the various bars may be bonded together by a suitable adhesive, such as Master Bond EP30. In order to damp any external forces which might be transmitted to the bar assembly, I prefer to fill the space between the ends of spacer bars 18 and 22 and spacer bars 20 and 24 with an optical gel, such as Nu-Sil optical gel, available from McGhan Nu Sil Corporation.

While certain preferred dimensions, materials, configurations and arrangements were detailed in the above description of preferred embodiments, those can be varied, where suitable, with similar results. Other components of systems in which my electro-optic modulator can be used are not described, since they are conventional. Other applications, variations and ramifications of this invention will occur to those skilled in the art upon reading this disclosure. Those are intended to be included within the scope of this invention as defined in the appended claims.

I claim:

1. An electro-optic modulator having improved compensation for temperature and strain variations which comprises:
   two elongated active bars of electro-optic material having the ability to rotate circularly polarized light in response to a change in voltage imposed thereon;
   said active bars arranged end-to-end along a common axis;
   said active bars arranged to rotate circularly polarized light in opposite directions;
   electrode means on opposite sides of each of said active bars; and
   means for connecting a source of varying voltage to said electrodes with opposite field polarity;
   whereby uniform changes in strain or temperature will be canceled out and a change in voltage field will result in summed polarization effects.

2. The electro-optic modulator according to claim 1 further including pairs of spacer bars on opposite sides of said active bars with a space therebetween, said electrode means comprising thin electrodes extending from said opposite sides of said active bars to the tops of said spacer bars.

3. The electro-optic modulator according to claim 2 further including outer bars extending along the sides of said spacer bars opposite said active bars to distribute temperature and strain uniformly to said active bars.

4. The electro-optic modulator according to claim 3 wherein said active bars, spacer bars and outer bars are all have substantially the same composition.

5. The electro-optic modulator according to claim 3 wherein said active bars, spacer bars and outer bars are formed from LiNbO3 or PbLaZrTi.

6. In an electro-optical modulator system which comprises a body having an elongated cavity therethrough; means for holding an end of an optical fiber adjacent to a first end of said cavity; lens means within said first end of said cavity in direct physical contact with said fiber, said lens means adapted to collimate light received from said optical fiber into a narrow collimated beam and to direct that beam along said cavity; polarizing means in direct physical contact with said lens to polarize said beam; retarding means positioned in contact with said polarizing means to retard said polarized light beam; modulating means for receiving said beam and rotating its polarization; and mirror means receiving said beam from said modulating means and reflecting said beam back through said cavity; the improvement wherein:
   said modulating means comprises two elongated active bars of electro-optic material having the ability to rotate circularly polarized light in response to a change in voltage imposed thereon; said active bars arranged end-to-end along a common axis; said active bars arranged to rotate circularly polarized light in opposite directions; electrode means on opposite sides of each of said active bars; and means for connecting a source of varying voltage to said electrodes with opposite field polarity;
   whereby uniform changes in strain or temperature will be canceled out and a change in voltage field will result in summed polarization effects.

7. The improvement according to claim 6 further including pairs of spacer bars on opposite sides of said active bars with a space therebetween with said electrode means comprising thin electrodes extending from said opposite sides of said active bars to the tops of said spacer bars.

8. The improvement according to claim 7 further including outer bars extending along the sides of said spacer bars opposite said active bars to distribute temperature and strain uniformly to said active bars.

9. The improvement according to claim 8 wherein said active bars, spacer bars and outer bars are all have substantially the same composition.

10. The improvement according to claim 9 wherein said active bars, spacer bars and outer bars are formed from LiNbO3 or PbLaZrTi.

* * * * *